Dec. 5, 1961 A. D. FOSTER 3,011,593
CHECK-OUT COUNTER

Filed Sept. 4, 1959 3 Sheets-Sheet 1

INVENTOR.
ALLAN D. FOSTER
BY
Cullen & Cantor
ATTORNEYS

Dec. 5, 1961 A. D. FOSTER 3,011,593
CHECK-OUT COUNTER
Filed Sept. 4, 1959 3 Sheets-Sheet 2
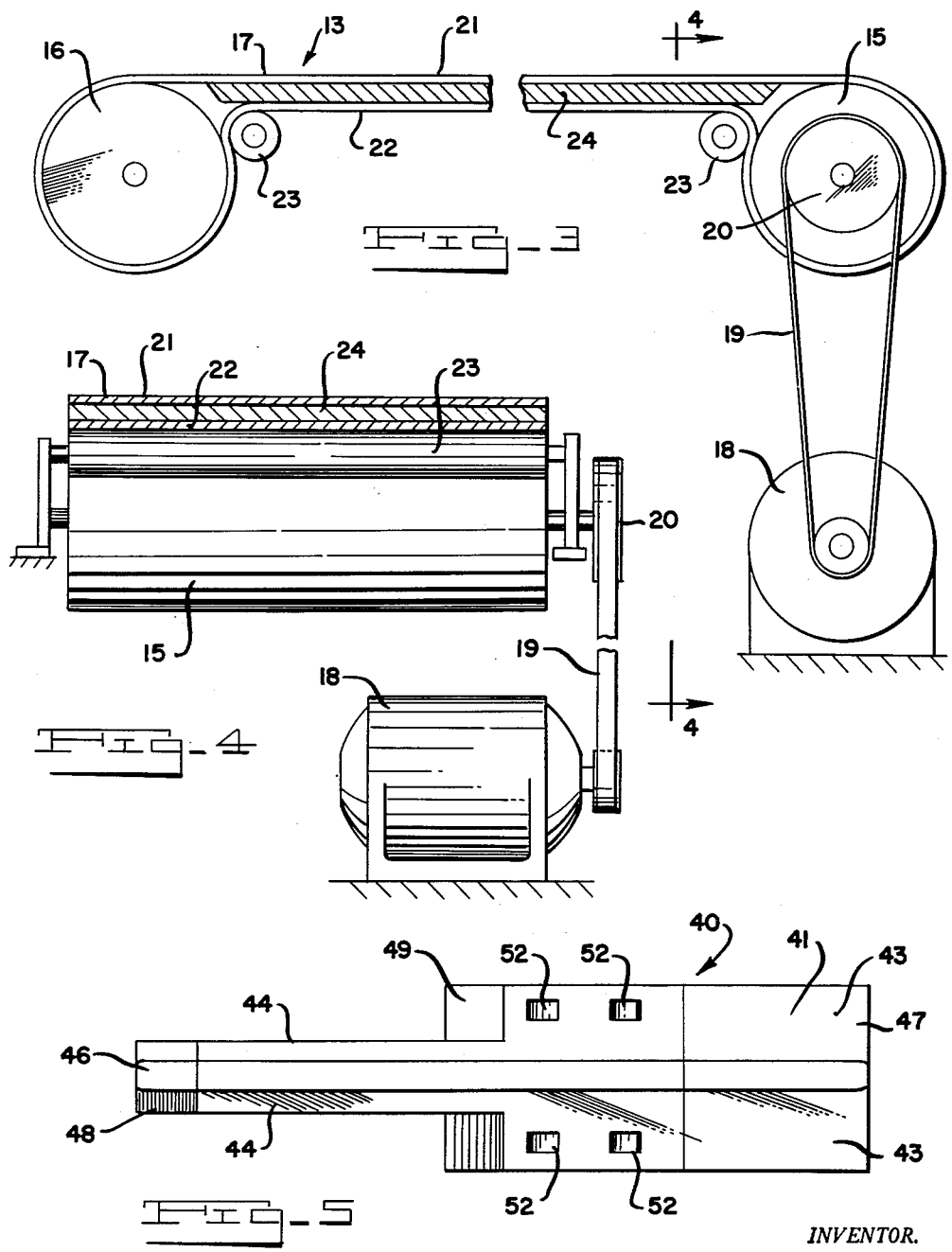
INVENTOR.
ALLAN D. FOSTER
BY
Cullen & Cantor
ATTORNEYS

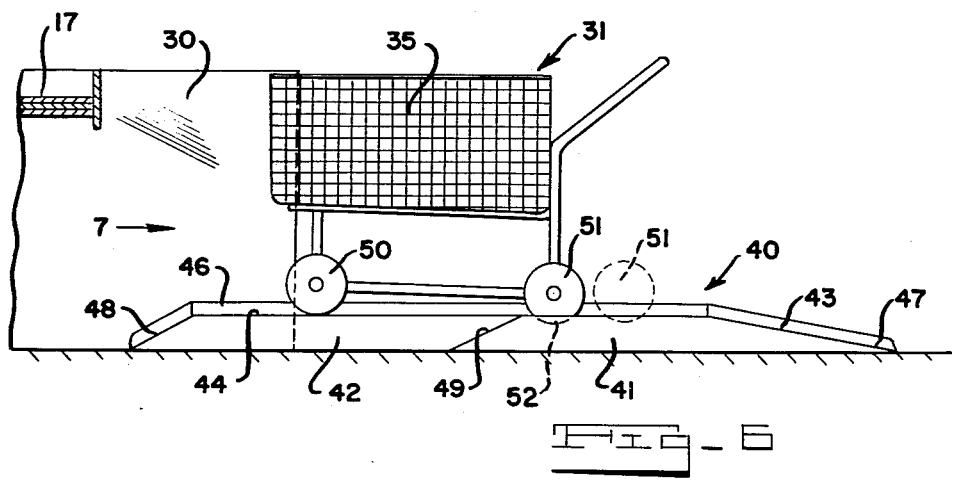
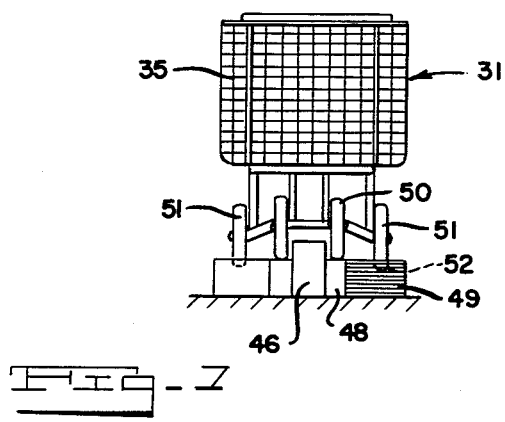

United States Patent Office 3,011,593
Patented Dec. 5, 1961

3,011,593
CHECK-OUT COUNTER
Allan D. Foster, Grosse Pointe, Mich., assignor to Almor Corp., Detroit, Mich.
Filed Sept. 4, 1959, Ser. No. 838,340
2 Claims. (Cl. 186—1)

This invention relates to a check-out counter useful in supermarkets and the like.

In supermarkets, it is customary for the customer or shopper to select her own merchandise and place it into a wheeled shopping cart and then take the cart to a check-out counter where a cashier or check-out girl checks out the merchandise and collects the money for the purchase. In one type of counter the check-out girl removes the merchandise from the shopping cart and places it upon a conveyor belt which carries the merchandise to a bagging space on the counter where it is placed into shopping bags. However, in this type of counters, the cart has always been so positioned that the girl had to move about as she unloaded the merchandise from the cart, had to reach too far to place the merchandise upon the conveyor and had to move out from her checking position to move the emptied cart out of her way.

Thus, it is an object of this invention to provide a check-out counter wherein the shopping cart forms the means for carrying the merchandise to the check-out girl and wherein she unloads the merchandise upon a conveyor belt which removes the merchandise from her and takes it to a bagging section of the counter, and wherein the counter is so arranged that the girl does not need to move from her checking position to unload the cart and to get rid of the cart once unloaded and does not need to stretch too far to place the merchandise on the belt.

A further object of this invention is to form a check-out counter having a substantially horizontal conveyor belt which is of an overall thickness that is only slightly greater than the sum of the thicknesses of the two laps of an endless conveyor belt so that the belt may form a thin bridge between two sections or pedestals of the check-out counter and wherein the cart once unloaded may be pushed through a passageway formed in the counter under the belt for removing the cart from the check-out girl's position without her moving from her position.

Yet another object of this invention is to provide a means for elevating the cart while it is in the area of the check-out girl so that she may more conveniently reach the merchandise, but wherein this elevating means returns the cart back to floor level for passageway through the counter.

These and other objects and advantages of this invention will become apparent upon reading the following description of which the attached drawings form a part.

In these drawings:

FIG. 3 is a view of the conveyor means per se.

FIG. 4 is a cross-sectional view taken in the direction of arrows 4—4 of FIG. 3.

FIG. 5 is a top view of the elevating platform.

FIG. 6 is a view taken in the direction of arrows 6—6 of FIG. 1.

FIG. 7 is a view taken in the direction of arrow 7 of FIG. 6.

Figure 1:
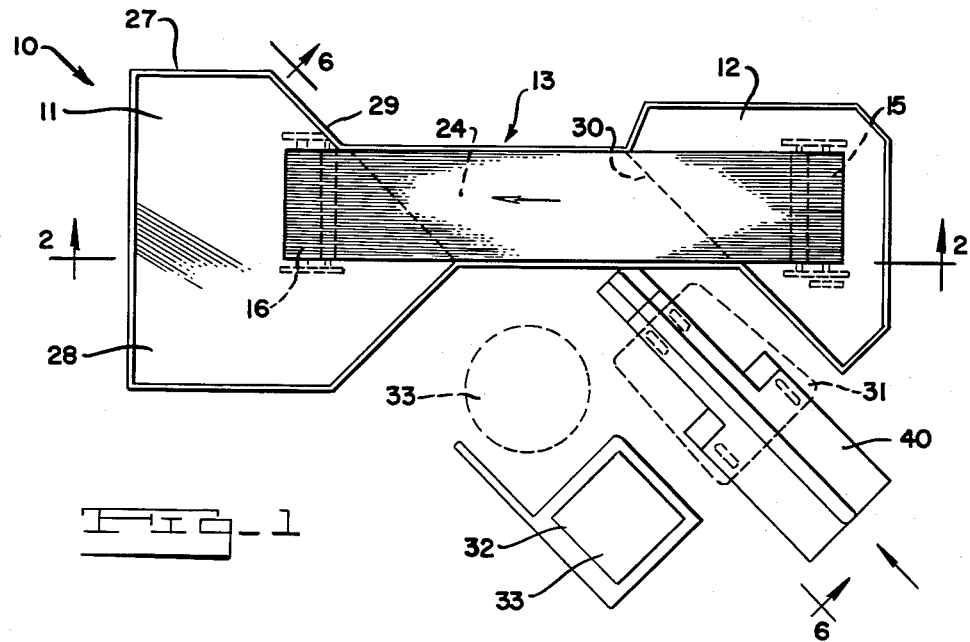
FIG. 1 is a top plan view of the complete check-out counter including the cash register support and the platform means for elevating the shopping cart.
Figure 2:
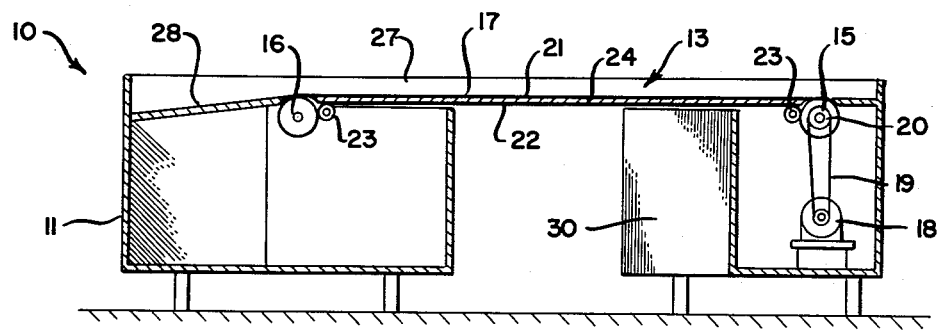
FIG. 2 is a cross-sectional, elevational view taken in the direction of arrows 2—2 of FIG. 1.

The check-out counter 10 is formed of two pedestals 11 and 12 which are spaced apart a predetermined distance and which are in the form of cabinets. A conveyor means 13 interconnects these two pedestals. This conveyor means consists of a pair of primary rollers 15 and 16, each being mounted upon an axle for rolling movement within one of the pedestals. Around the rollers an endless conveyor belt 17 is arranged for stretching between the two pedestals. A power means in the form of a motor 18 connected by a belt 19 to a pulley 20 secured to roller 15 is provided for power operating roller 15 to thus move the belt.

The belt 17 is provided with an upper lap 21 which carries the merchandise and a bottom return lap 22.

A pair of secondary rollers 23 are arranged axially parallel to and closely adjacent to primary rollers 15 and 16 and also closely adjacent to the underside of the top lap of the belt 21. These secondary rollers, which preferably are of a considerably smaller diameter than the primary rollers, bear against the underside of the return lap 22 so that the return lap is held closely adjacent to the top lap between the two secondary rollers and thus, between the two pedestals. Thus, the overall thickness of the conveyor in the area between the two pedestals is only slightly greater than the sum of the thicknesses of the individual laps. A thin metal plate 24 may be inserted between the two laps for greater rigidity, with the thin plate stretching between and secured at its opposite ends to the two pedestals (this plate is not illustrated).

The pedestal 11 is formed as a merchandise receiving section and is provided with a top bagging surface 26 upon which merchandise may be placed into paper bags. The pedestals are large cabinets supported upon legs upon the floor and may be provided with compartments or doors for storage of such things as paper bags, etc. A railing 27 is arranged at the tops of the pedestal and surrounds the pedestals as well as passing on either side of the conveyor belt 17. This railing prevents any of the merchandise from spilling off the counter.

The two facing parts of the pedestals, namely pedestal walls 29 and 30 are arranged substantially parallel to each other and are arranged diagonally relative to the conveyor 13 so that a diagonally arranged passageway is formed between the two pedestals beneath the conveyor. This passageway is of sufficient height and of sufficient width to pass a standard shopping cart 31, such as illustrated in FIG. 6. The passageway is extended by a cabinet 32 upon which a cash register 33 is rested. This cabinet is spaced from both of the pedestals but is aligned with the wall 29 of the receiving pedestal and hence, parallel with the wall 30 of the pedestal 12 to thus lengthen the passageway and form an entrance.

The check-out girl (shown in dotted lines as a circle) 33 stands between the pedestal 11 and the cabinet 32 on one side of the passageway. The customer rolls the cart into the passageway at the entrance. Then the girl reaches into the cart with one hand, to remove the merchandise and place it upon the conveyor belt. With her other hand, she can manipulate the cash register 33. Thus, she need not move from her position to unload the cart. When she finishes unloading the cart, she merely pushes it through the passageway so that it comes out on the opposite side of the check-out counter. The bagger may place the bags of merchandise back into the cart so that the shopper may wheel them to her automobile or may move it away to a place where the next customer can take it.

The shopper may walk around to the exit side of the passageway and take the cart with its bags or may take the bags alone.

With this arrangement, it can be seen that the check-out girl can unload the merchandise and at the same time operate the cash register without moving from her position. Since the conveyor belt 17 is kept operating continuously, the merchandise is continuously carried away as she places it upon the belt. Also, when she finishes unloading the cart, she need not move from her position but may simply push the cart through the check-out counter and out of her way.

The elevating platform

Since the conventional shopping basket 31 which is used in most markets today is formed with a basket 35 whose bottom is low and necessitates the check-out girl to bend to reach the merchandise on the bottom of the basket, it is desirable to raise the height of the basket in the area of the check-out girl so that she need not bend but instead may reach the merchandise conveniently. Such a means is provided in the form of an elevating platform 40 (see FIGS. 5, 6 and 7).

This elevating platform is formed of a wide end 41 and a narrow end 42 with the two ends being centrally aligned to form tracks 43 and 44 separated by an upstanding rail 46. The opposite ends of the platform are sloped downwardly toward the floor at 47 and 48. Also, the side portions of the wide part of the platform, at the point where the wide point joins the narrow part, are likewise sloped down towards the floor at 49. Thus, the front wheels 50 of the cart, which are close together, may roll upon the wide section then upon the narrow section of the elevating platform. The widely spaced wheels 51 of the shopping cart remain upon the wide section of the platform and drop into depressions 52 formed in the wide portion and which hold the wheels so the cart may not be accidentally moved.

In operation, the shopper pushes the cart by its handle up the sloping part 47 to roll the cart upon the top surface of the platform. Thereafter, the check-out girl moves the cart until its rear wheels drop into one of the sets of depressions (whichever set most conveniently positions the cart relative to herself). The front wheels 50 of the cart are positioned upon the tracks 44 of the narrow part of the platform. Once the cart is unloaded, she pushes the empty cart further along the platform so that the front wheels drop down the slope 48 and the rear wheels drop down the slope 49 and the cart then passes beneath the conveyor belt 17 (see FIG. 6).

The vertical rail 46 serves to keep the cart on the tracks and prevent the cart from moving off the side of the platform.

This invention may be further developed within the scope of the following attached claims. Accordingly, it is desired that the foregoing description be read as being merely illustrative of an operative embodiment of this invention and not in a strictly limiting sense.

Having described an operative embodiment of this invention, I now claim:

1. A supermarket check-out and cash register support combination comprising a cash register support and a counter; the latter comprising two spaced pedestals connected by a conveyor belt bridging the space between them to provide a tunnel under the belt and between the pedestals; the cash register support being aligned with one of the pedestals but spaced away from it so that a register on the support will have its operating front face facing such pedestal to provide a work station between the support and such pedestal, and a side of the register support will form a side boundary of a clear path for shopping basket cart leading to and forming an entrance to said tunnel, such path being along side said work station.

2. A construction according to claim 1 wherein the facing tunnel-forming walls of the pedestals are parallel but at an acute angle to the axis of movement of the belt, with the front face of the register support also being at an acute angle to such axis.

References Cited in the file of this patent

UNITED STATES PATENTS

| | | |
|---|---|---|
| 1,868,267 | Young | July 19, 1932 |
| 1,881,898 | Olson | Oct. 11, 1932 |
| 2,227,283 | Soref | Dec. 31, 1940 |
| 2,368,986 | Hem | Feb. 6, 1945 |
| 2,596,686 | Hess | May 13, 1952 |
| 2,604,190 | Meyer | July 22, 1952 |
| 2,625,256 | Smith | Jan. 13, 1953 |
| 2,723,728 | Crawford | Nov. 15, 1955 |
| 2,774,492 | Harrison | Dec. 18, 1956 |
| 2,893,517 | Sundberg | July 7, 1959 |